Figure 1:
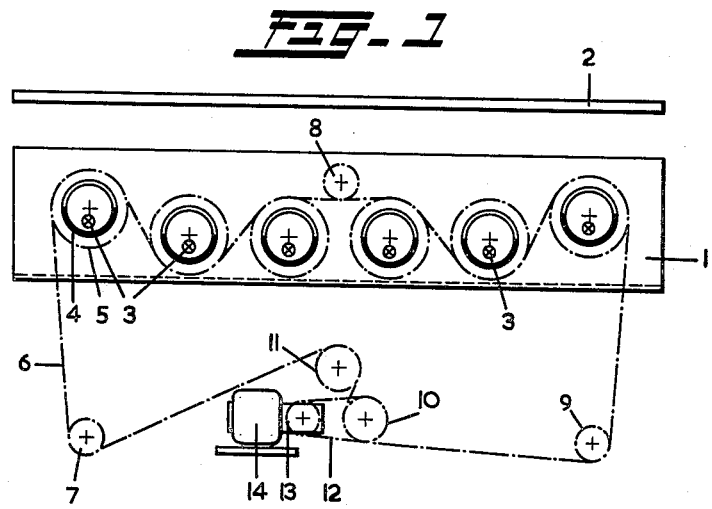

Feb. 4, 1964    H. VAN HOUWELINGEN    3,120,162
EXPOSURE DEVICE
Filed Oct. 18, 1960

HENDRIK VAN HOUWELINGEN
INVENTOR.

BY Wenderoth, Lind
and Ponack
ATTORNEYS

United States Patent Office 3,120,162
Patented Feb. 4, 1964

3,120,162
EXPOSURE DEVICE
Hendrik van Houwelingen, Rijswijk, Netherlands, assignor to N.V. Lichtdrukpapierfabriek de Atlas, Delft, Netherlands, a corporation of the Netherlands
Filed Oct. 18, 1960, Ser. No. 63,366
Claims priority, application Netherlands Oct. 21, 1959
4 Claims. (Cl. 95—73)

The present invention relates to an exposure device, more particularly for photo-printing apparatus.

In exposure devices of this type a plurality of exposure lamps or tubes is mostly used, because a relatively large area is to be exposed. Said lamps or tubes have one or a plurality of shutters associated with them, which can allow the luminous flux to pass for a certain adjustable time.

Known exposure devices of this type do not entirely satisfy, for in actual practice the exposure of the photo sensitive material is found to take place relatively irregularly.

The object of the invention is to provide an improved exposure device, so that not only the luminous flux per unit of area has the same intensity, but in addition the time of exposure is perfectly equal for any part of the area to be exposed.

To achieve this end according to the invention the exposure device of the type described is so arranged according to the invention that it comprises a plurality of electrically series-connected tubular lamps, more particularly high-pressure mercury vapour lamps, each of which is surrounded by a shutter, which is rotatable about its longitudinal axis and is formed as a cylindrical jacket provided with a window, whose longitudinal sides are parallel to the axis of the cylinder, as well as a synchronised driving means enabling the joint shutters to be only rotated simultaneously and through the same angle at a uniform speed.

The exposure device may also be so constructed that the tubular lamps which have other lamps located only on one side of them, are offset from the plane containing the other lamps in the direction in which the light mainly radiates.

For elucidating the invention an embodiment of the exposure device will be described with reference to the accompanying drawing.

Figure 2:
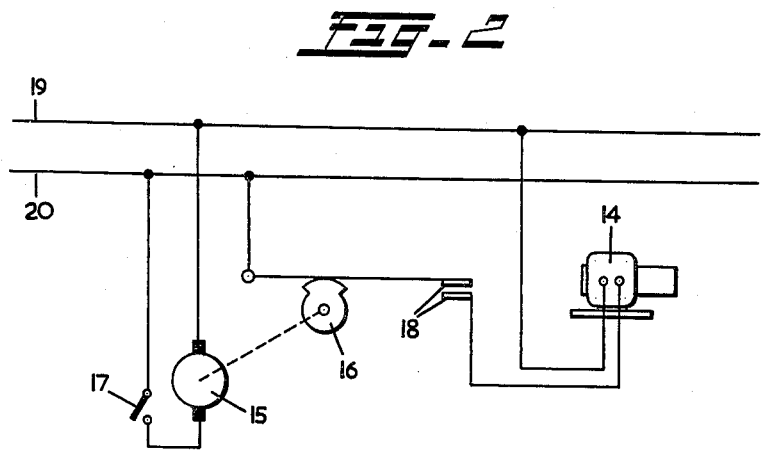

In the drawing:

FIG. 1 is a diagrammatic side elevation view of the exposure device according to the invention, and FIG. 2 is a circuit diagram showing a timer for controlling the motor of the device of FIG. 1.

The numeral 1 designates a lamp compartment, through the upper side of which light can shine, 2 is a transparent glass sheet, on which material such as photo sensitive paper, transparent films and the like may be laid for exposure.

The light compartment 1 contains a plurality of tubular lamps 3. Each tubular lamp 3 is surrounded by a shutter, which is in the form of part of a round cylindrical jacket. The shutter 4 has its longitudinal axis parallel to the longitudinal axis of the tubular lamp 3. In the position of the shutter 4, as shown in the drawing, the maximum luminous flux of the tubular lamp 3 radiates upwardly, whereas the lower side of the tubular lamp is screened. It will be clear, that when the shutter 4 is rotated about its longitudinal axis at a uniform speed light radiates for exactly the same time in all radial directions during one entire revolution of the shutter 4.

The conventional shutters of exposure devices have two wings, which move towards each other during the closing movement of the shutter. It will be clear, however, that in shutters of this type light will shine longest through the gap which just prior to the entirely closed position is still open and which comes open first after the wings move apart again. What happens therefore is that when the shutter is entirely opened a bundle of light passes therethrough which adjacent the edges of the bundle will shine for a briefer time than in the middle where the light shines longest. When the exposure device comprises a plurality of lamps or tubes, this phenomenon makes itself felt with each lamp or tube having a shutter associated therewith, this resulting in a non-uniformly exposed print or photostatic copy.

In order to achieve the contemplated effect of the rotating shutters according to the invention it is necessary for the shutters to move in perfect synchronism.

To achieve this end each shutter 4 has a sprocket 5 secured thereto. A chain 6 is passed over all of the sprockets 5 which chain is furthermore passed about guide rollers 7—11. Guide roller 10 has a second chain 12 passed about it which at the same time passes about a driving roller 13 which is driven by a motor 14.

For making an exposure the motor 14 is started and allowed to run for so long a time and at such a speed that all of the shutters revolve through 360° or after one revolution of 180° stop for a time that is adjustable at will and, after said adjustable time has elapsed, rotate preferably in the same direction through 180° again, so that they return to the initial position. A timer for controlling the operation of the motor to accomplish this movement of the shutters is shown in FIG. 2. In the figure, the motor 14 is connected across power lines 19 and 20, and in one side of the circuit is a pair of contacts 18, one of the contacts being an arm which is spring loaded against the cam surface of a cam 16. The cam 16 is in turn driven by a cam driving motor 15 which is also connected across the power lines 19 and 20, and the cam driving motor is turned on and off by a switch 17. It will be understood that the cam driving motor 15 rotates the cam 16, and during the time the high part of the cam profile is against the spring arm of the upper contact 18, the contacts 18 are separated and the motor 14 does not run, and while the low part of the cam profile is against the spring arm of the upper contact 18, the contacts 18 are closed and the motor 14 runs. The relative times during which the motor 14 is driven or not driven can be varied by changing the cam profile or changing the speed of the cam driving motor 15.

It should be noted that the motor control is a conventional arrangement, being disclosed, for instance, in U.S. Patent 2,693,097 to Chatelain. Other equivalent devices will readily suggest themselves to those skilled in the art.

It is also possible to give the motor 14 a constant regulable speed and to regulate the exposure time by causing the shutters to make more or less complete revolutions.

If desired, the shutters may rotate in opposite directions relative to one another in accordance with the drawing, so that fewer tensioning rollers are required.

In the present embodiment the shutters are driven electrically, but it is also possible to apply a different drive e.g. a pneumatic one.

Another particularity of the tubular lamps 3 according to the invention is that electrically these are series-connected. Preferably said tubular lamps are high pressure mercury vapour lamps. The importance of this series-connection of the tubular lamps is that a substantially equivalent and simultaneous aging of the lamps takes place. If, therefore, said lamps are simultaneously put into operation and are simultaneously renewed, the luminous flux emitted by each tubular lamp will be substantially equal.

As shown in the drawing a tubular lamp located at the extreme left and at the extreme right is placed slightly closer to the surface to be exposed. Thus the result is achieved that portions of the surface to be exposed that are located above said tubes, which portions receive light from a small number of tubes, will all the same receive a same amount of luminous flux.

An important advantage of the rotary shutters formed as part of a cylindrical jacket is that they occupy very little space during the opening and closing movements. In the case of shutters that swing open there must be a larger distance between the glass sheet and the tubular lamps, which reduces the efficiency of the lamps.

In the construction according to the invention it is possible to place the glass sheet 2 close above the tubular lamps, so that the operating speed of the photoprinting apparatus is appreciably increased.

I claim:

1. An exposure device particularly for a photoprinting apparatus, comprising a plurality of parallel tubular lamps electrically connected in series and lying in a substantially flat plane, a rotatable shutter around each tubular lamp rotatable about the longitudinal axis of the lamp, said shutters each being in the form of a cylindrical jacket having a window having longitudinal sides parallel to the axis of the tubular lamps, the windows in all the jackets being in the same relative positions with respect to the lamps, and driving means connected to said shutters for rotating said shutters simultaneously through equal angles at a uniform speed, said driving means having timer means as a part thereof causing said driving means to rotate said shutters during the time said lamps are energized from a starting position through 180° and then further rotate said shutters in the same direction through a further 180° to the starting position of said shutters.

2. An exposure device as claimed in claim 1 in which the tubular lamps at the opposite ends of said plurality of tubular lamps are offset in the same direction from the plane in which the lamps lie and in a direction in which the windows in the jackets face when the lamps are radiating light for the purpose of photoprinting.

3. An exposure device as claimed in claim 1 in which said timer means causes said driving means to rotate said shutters through both 180° angle one immediately after the other.

4. An exposure device as claimed in claim 1 in which said timer means causes said driving means to rotate said shutters through said first 180°, causes said driving means to stop driving said shutters for a predetermined length of time, and then causes said driving means to drive the shutters through the further 180°.

References Cited in the file of this patent

UNITED STATES PATENTS

| | | |
|---|---|---|
| 2,346,983 | Noel | Apr. 18, 1944 |
| 2,357,541 | Pfeil | Sept. 5, 1944 |